4 Sheets--Sheet 1.

J. F. TAYLOR.

Steam and Hydraulic Presses.

No. 6,085.

Reissued Oct. 13, 1874.

Witnesses:
Solon C. Kemon
Chas. A. Pettit

Inventor:
Jno. F. Taylor
By Munn & Co
attorneys

4 Sheets--Sheet 2.

J. F. TAYLOR.

Steam and Hydraulic Presses.

No. 6,085.

Reissued Oct. 13, 1874.

Witnesses:
Solon Kenyon
Chas. A. Pettit

Inventor:
Jno. F. Taylor
By
Munn & Co
attorneys

4 Sheets--Sheet 3.
J. F. TAYLOR.
Steam and Hydraulic Presses.
No. 6,085.
Reissued Oct. 13, 1874.
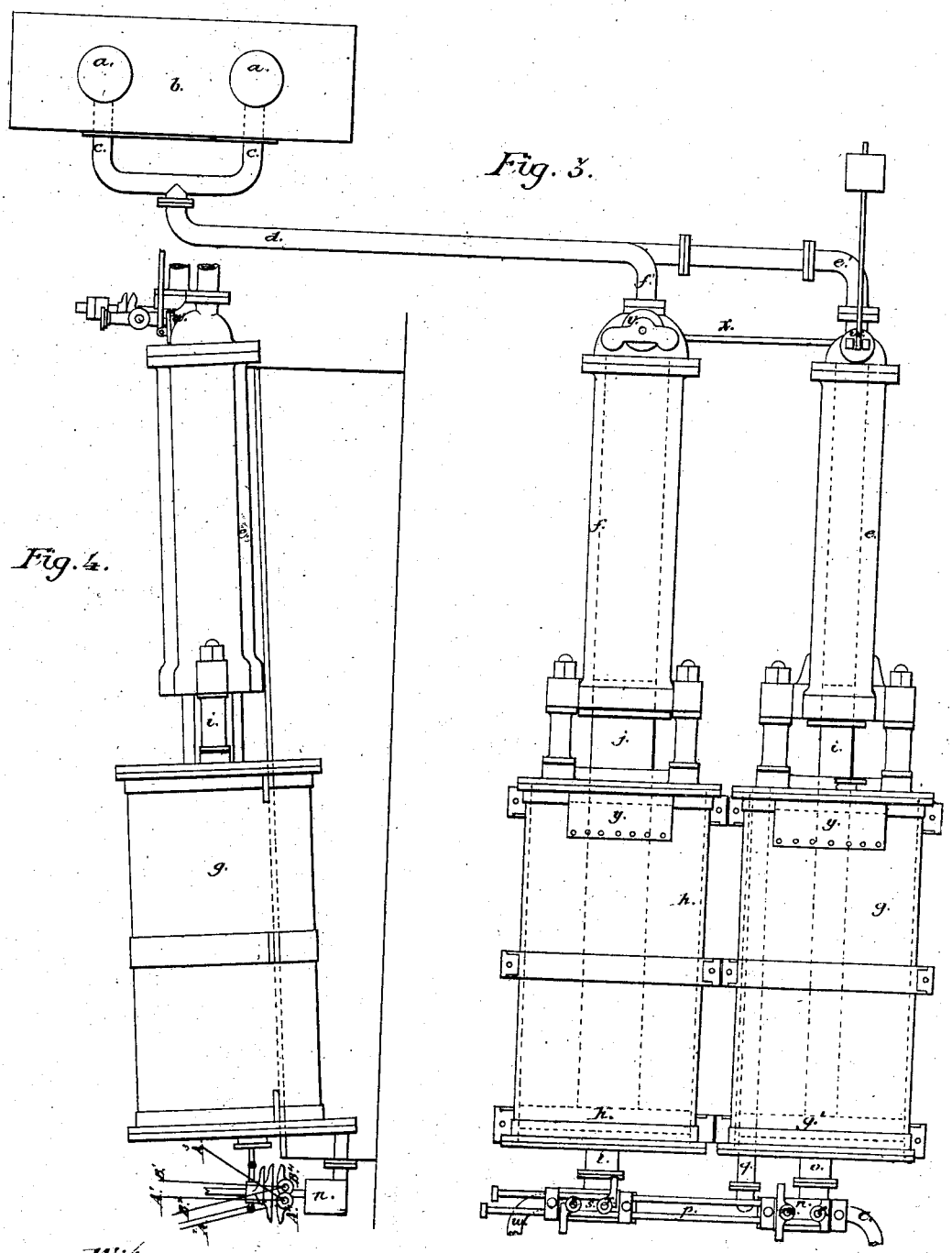
Witnesses:
Solon Kemon
Chas. A. Pettit
Inventor:
Jno. F. Taylor
By Munn & Co.
Attorneys

J. F. TAYLOR.

Steam and Hydraulic Presses.

No. 6,085.

Reissued Oct. 13, 1874.

*Witnesses:*
Solon C. Kemon
Chas. A. Pettit

*Inventor:*
Jno. F. Taylor
By Munn & Co
attorneys

UNITED STATES PATENT OFFICE.

JOHN F. TAYLOR, OF CHARLESTON, SOUTH CAROLINA.

IMPROVEMENT IN STEAM AND HYDRAULIC PRESSES.

Specification forming part of Letters Patent No. 112,298, dated February 28, 1871; reissue No. 4,851, dated April 2, 1872; reissue No. 6,085, dated October 13, 1874; application filed September 3, 1874.

*To all whom it may concern:*

Be it known that I, JOHN F. TAYLOR, of the city and county of Charleston and State of South Carolina, have invented a new and Improved Hydraulic Press; and I do hereby declare that the following is a full, clear, and exact description of the same, reference being had to the accompanying drawings forming part of this specification, in which—

Figures 1, 5:
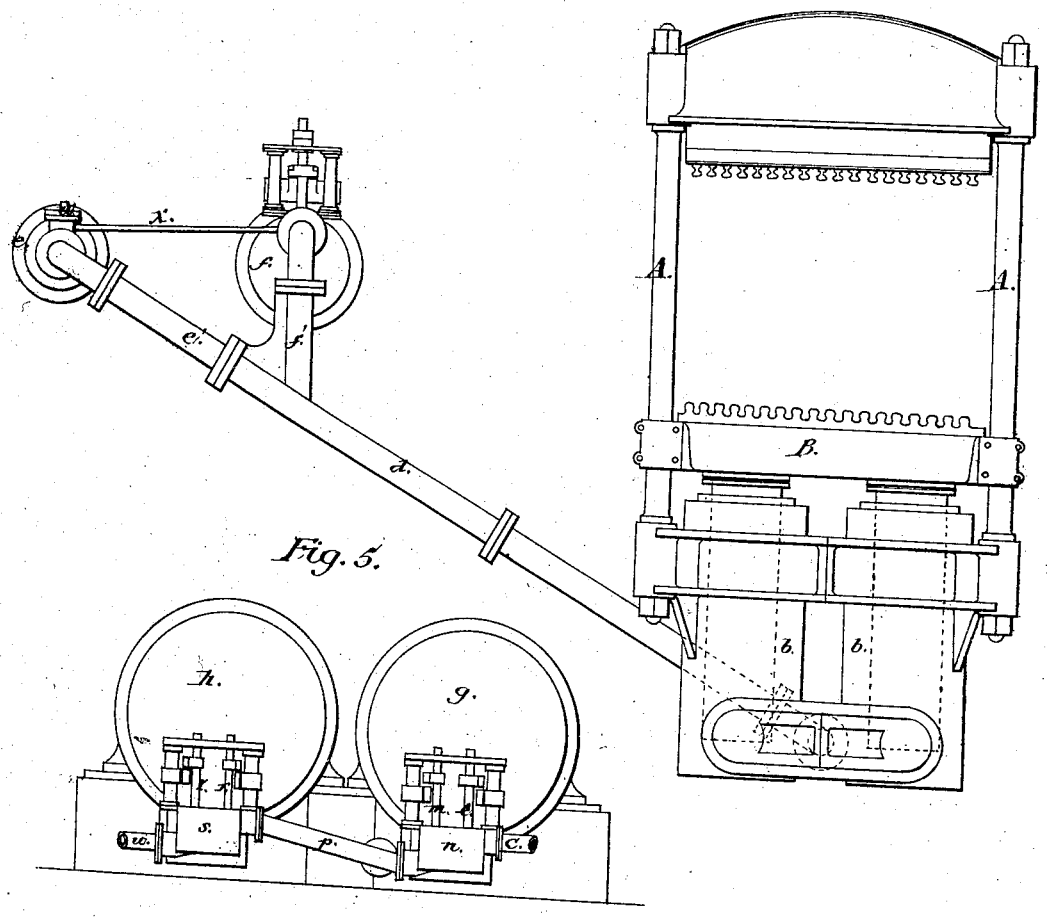
Figure 2:
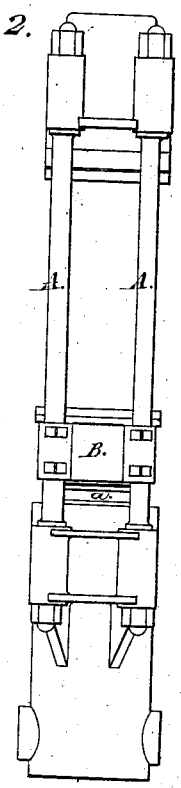
Figure 9:
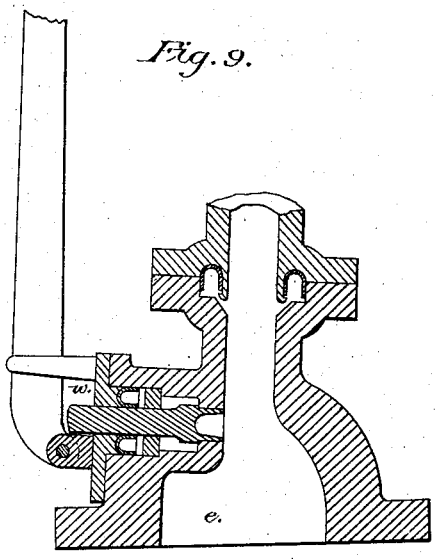
Figure 7:
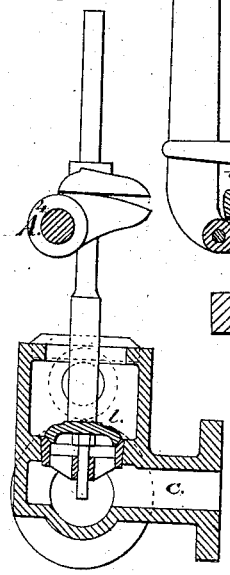
Figure 8:
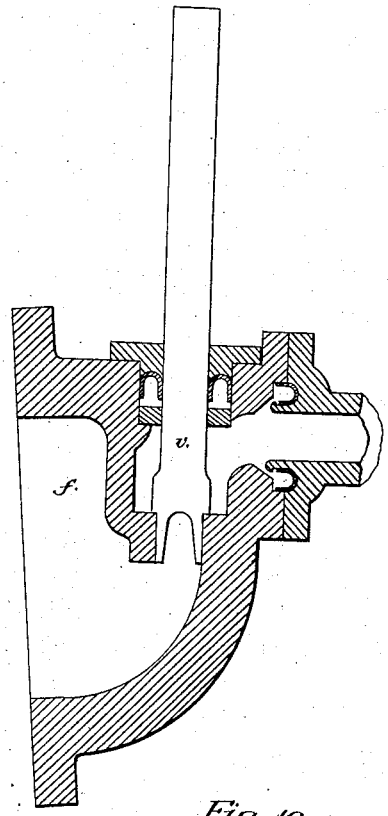
Figure 6:
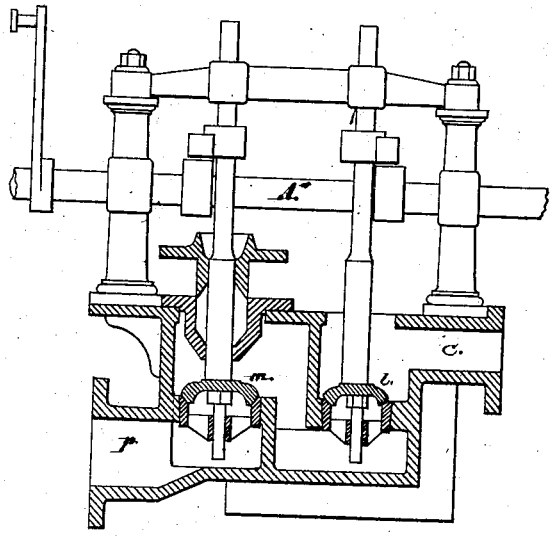
Figure 10:
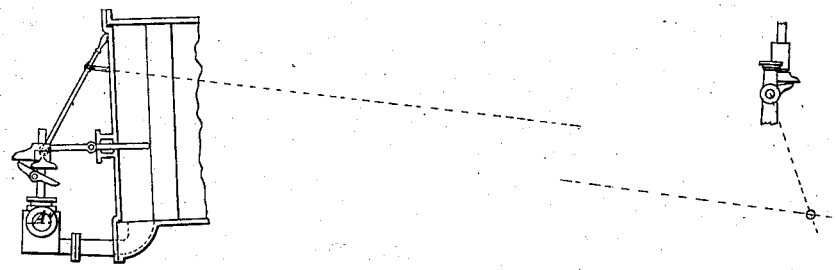

Figure 1 is a side elevation of the press and liquid connecting-pipe, with an end elevation of the liquid-chambers. Fig. 2 is an end elevation of the press. Fig. 3 is a plan view of the steam-cylinders, liquid-chambers, and liquid connecting-pipes, with a transverse horizontal section of the rams. Fig. 4 is a side elevation of one of the steam-cylinders, with a sectional elevation of its liquid-chamber. Fig. 5 is an end elevation of the steam-cylinder. Fig. 6 is a longitudinal sectional elevation of the chest that contains the valves which admit steam to and exhaust it from the cylinder, with a side elevation of the rock-shafts and wipers by which said valves are operated. Fig. 7 is a transverse sectional elevation of the same. Fig. 8 s a sectional elevation of the end of the liquid-chamber *f*, and of the check-valve therein. Fig. 9 is a sectional elevation of the end of iquid-chamber *e*, and of the safety-valve thereon; and Fig. 10 is a sectional elevation of either f the steam-cylinders and of the rock-shaft, ogether with a side elevation of one of the oes in the valve-stem, and of certain of the ipers on the rock-shaft, and of the hand-lever, nd of the rod that passes through the cylinder-head, and is caused by the piston to operte the hand-lever.

This invention relates to a press for cotton r any other material, in which the platen is perated by the introduction beneath the rams f oil or some other liquid under pressure, ommunicated to said liquid by the pistons of eam-cylinders, and in which the platen is lowed by its own weight and the expansion of e material compressed, both acting through e medium of the liquid upon the pistons, hich are permitted to yield by the opening valves in the ends of the cylinders, in rear the pistons, through which steam escapes fore the returning pistons, the pistons acting upon the platen alternately—one to impart the initial pressure, and the other the finishing pressure—the piston that imparts the initial pressure being operated by the exhaust steam of the other cylinder, which steam, having then done all that is required of it, is discharged into the atmosphere, and the piston that imparts the finishing pressure being operated by live steam from the boiler, which steam is subsequently discharged into the other cylinder, there to communicate another initial pressure to the platen.

Referring to the drawing, A is a press of ordinary construction, except as hereinafter specified, having a lower platen, B, which operates by moving upward. To the lower side of the platen B are attached, in any suitable manner, the upper ends of two vertical solid cylinders or rams, *a*, Figs. 1 and 3, which are inclosed in cases *b*, secured in the press-frame, each case having a cylindrical bore, which the rams fit closely. Into the bottoms of said bores pipes *c* open, (one pipe to each bore,) which pipes are branches extending from the lower end of an inclined tube, *d*, the upper extremity of which is connected, by branches *e′ f′*, with the nearest ends of horizontal chambers *e f*, that contain oil or other suitable liquid. At their other ends the chambers *e f* are connected with horizontal steam-cylinders *g h*. From the pistons *g′ h′* of said cylinders rams *i j* extend, passing through stuffing-boxes in the ends of the cylinders, and entering, respectively, the chambers *e f*, the interiors of which said rams fit closely. The chamber *e* and ram *i* are of less diameter than the rams *a*, for a purpose hereinafter explained. C is a pipe leading from the boiler, and serving to conduct live steam direct to the valve-chamber *n*.

Prior to any pressing operation the pistons are both at the rear ends of the cylinders. On raising the valve *l*, the valve *m* meantime remaining closed, live steam flows through the induction-pipe *o* directly to the rear of the piston *g′*, and starts it toward the front end of the cylinder *g*. When the piston has reached the front end of the cylinder, the valve *l* is made to close by means set forth at the end of this description, and the valve *m* is opened. The closing of the valve *l* shuts off the supply of live steam that propelled the piston *g′* forward against the pressure of the liquid in the chamber $e$, and the opening of the valve $m$ enables the pressure of the liquid to force the piston back again to the rear end of the cylinder, driving the steam out through said valve into the pipe $p$ that connects the valve-chamber of the two cylinders. As the inlet-valve of the second chamber has thus far remained closed, the steam ejected from the cylinder $g$, having no other outlet, passes into the pipe $q$, which opens into the connecting-pipe, and is thereby conducted into the cylinder again, the pipe $q$ passing along the outside of the cylinder to its front end, where it enters the cylinder, and discharges the steam which fills the whole space in front of the piston. This is done before the pressing operation begins, and for the purpose of thoroughly warming the interior of the cylinder, so that it may the less condense the live steam that is subsequently, in the course of the pressing operation, poured into it.

This having been done, the next operation is to impart the initial pressure to the platen by starting the piston $h'$ in the cylinder $h$, to effect which the valve $r$ of the chamber $s$ is opened, and the steam in the cylinder $g$ thereby drawn back through the pipe $q$ into the connecting-pipe $p$, and from the latter, through the valve $r$ and induction-pipe $t$, conducted directly against the rear of the piston $h'$, setting the same in motion. The exhaust steam of the cylinder $g$ thus becomes the motive steam of the piston $h'$, and continues to flow from one cylinder to the other until the pressure on the two pistons is equalized. Then the valve $r$ is closed by its own weight, and if any steam still remains in front of the piston $g'$ it must be disposed of by opening a puppet-valve in a pipe that leads from the front end of the cylinder $g$, around outside of the cylinder $h$, to the exhaust-pipe $u$, Fig. 3, and thus allow the surplus steam to escape. As the piston $h'$ moves forward it pushes the ram $j$ into the chamber $f$, and the ram $j$ consequently displaces the fluid in the chamber, and forces it through the pipe $f'$, tube $d$, and branches $c$ into the bores of the cases $b$ beneath the rams $a$, which are thereby raised and lift the platen B. This movement of the platen continues until the piston $h'$ either reaches the front end of the cylinder $h$ or is stopped by the resistance which it meets. As soon as the piston $h'$ stops a check-valve, $v$, placed at the end of the chamber $f$ and across the mouth of the pipe $f'$, and which is lifted by the flow of liquid through the latter, falls automatically and prevents the return of the liquid. The steam in the cylinder $h$ remains shut up therein. To complete the pressing operation the valve $l$ is again opened and live steam admitted against the rear of the piston $g'$, which is thereby forced forward into the cylinder $g$, and by means of its ram $i$ drives a second current of liquid out of the chamber $e$ through the pipe $e'$, tube $d$, and branches $c$ into the bores of the cases $b$, from which current the platen B receives a fresh impulse and powerfully compresses the material between itself and the upper platen. To relieve the pipe $e'$, tube $d$, and branches $c$, if at any time the strain upon them becomes too great for their powers of resistance, a safety-valve, $w$, is placed in the upper side of the end of the chamber $e$, which valve, when raised, admits the liquids into a pipe, $x$, that connect the chamber $e$ with the chamber $f$, and allows the surplus liquid to flow into the latter. To provide against the concussion of the pistons against the front heads of the cylinders, external chambers $y$ are cast to the latter near their front extremities, said chambers communicating with the interiors of the cylinders at the extreme front ends of the latter, and also at points which are farther from the front ends of the cylinders than the pistons are wide, so that as soon as the pistons pass these points steam flows into the chamber and passes around to the space in front of the pistons, forming cushions between them and the cylinder-heads before the pistons can collide with the latter. The initial pressure upon the platen does not need to be as powerful as the finishing pressure, and the ram $i$, which applies the finishing pressure, is therefore worked by live steam, while the ram $j$, which applies the initial pressure, may be worked by either exhaust or live steam, as may be preferred. In addition to this provision the ram $i$ is made of considerably less diameter than the rams $a$, in order that the pressure exerted upon the latter may be in proportion, as their diameters are greater than the diameter of the ram $i$. The compression of the material having been completed it is properly tied, and then the valve $l$ is closed, the valve $m$ opened, and the weight of the platen, together with the expansion of the material, once more causes the piston $g'$ to return to the rear end of the cylinder $g$, and the steam in rear of the piston to pass around and fill the space in front of it, the platen meanwhile effecting a partial descent, then the check-valve $v$ and the exhaust-valve $z$ are opened, whereupon the platen completes its descent, the liquid forcing the ram $j$ back into the chamber $f$, the piston $h'$ to the rear end of the cylinder $h$, and the steam in the latter into the atmosphere through the exhaust-valve $z$. The next operation is to impart the initial pressure anew to the lower platen by discharging the steam in the cylinder $g$ against the rear of the piston $h'$, which operation, together with its attendant consequences, has already been fully described.

All the valves herein enumerated, except the safety-valve, are operated in the usual manner by means of rock-shafts bearing wipers, which impinge upon toes on the valve-stems as the shafts are rocked to and fro by the hand-levers attached to them. The rock-shaft which operates the check-valve has a connecting-rod, which may be hooked to the lever of either of the rock-shafts $A^4$ $B^4$. The rock-shaft $A^4$ operates the valves $l$, $m$, and $z$ simultaneously. The rock-shafts $B^4$ operate the valves $m$ and $r$ simultaneously. The diagram in Fig. 4 shows the various positions of the rock-shafts. At $A^1$ the valves *l m z* and the check-valve are closed. At $A^2$ the same valves are opened. At $A^3$ the valve *l* is closed, and the valves *m* and *z* and the check-valve are open. At $B^1$ the valves *l* and *z* are closed, and at $B^2$ they are open. The shaft $A^4$ has three wipers, which operate, respectively, the valves *l*, *m*, and *z*. The shaft $B^4$ has one wiper, which operates the valve *r*. The cylinders *g h* are provided with rods passing through stuffing-boxes in their rear heads and jointed to the hand-levers. As the pistons strike the front ends of said rods the latter are thrown back, so as to cause the hand-levers to turn the rock-shafts far enough to close the exhaust-valves *m* and *z*, successively, and thus stop the escape of steam at a time when enough is left to form cushions, which prevent the pistons from colliding forcibly with the cylinder-heads.

I am aware that there is nothing new in the use of direct-acting steam-pump mechanism for operating the rams of hydraulic presses, but in all such presses the rams have an intermittent progressive movement due to the action of the pump or pumps. I therefore do not wish to be understood as making any claim to the use of direct-acting steam-pumps for operating the rams of hydraulic presses. I am also aware that it is not new in a compound reciprocating crank-engine to allow the steam which has been used in one cylinder of a given diameter to flow into another cylinder of a different diameter to be therein used to propel the piston in a contrary direction from the first; and I therefore make no claim to such invention.

Having thus described my invention, what I claim as new is—

1. The method described of operating the platen by continuous hydraulic pressure applied directly from the piston of a steam-cylinder through the medium of its rod, substantially as and for the purposes described.

2. In a hydraulic press, the combination of hydraulic chamber *f* and steam-cylinder *h* with the piston *h'* and plunger *j*, substantially as and for the purpose described.

3. The combination of the forcing-rams of a hydraulic press, the steam-cylinders *f* and *h*, the chambers *y* and pipe *q*, connected and operating substantially as described.

4. As an improvement in steam and hydraulic presses, the combination with the steam cylinder *g* of the external chamber *y*, cast to the cylinder near its front, extending and communicating with the interior thereof at its extreme front end, and also at a point which is farther from the front end of the cylinder than the piston is wide, substantially as and for the purpose specified.

5. The combination, with the forcing-rams of a hydraulic press, of two steam-cylinders, by one of which an initial hydraulic pressure is applied with exhaust steam, and by the other the completing hydraulic pressure is applied with live steam, substantially as set forth.

6. The check-valve *v*, in combination with the liquid chamber *f*, pipe *d*, and ram *a*, substantially as and for the purpose specified.

Witnesses: JOHN F. TAYLOR.

SOLON C. KEMON,

CHAS. A. PETTIT.